(12) United States Patent
Chien et al.

(10) Patent No.: US 12,452,794 B2
(45) Date of Patent: Oct. 21, 2025

(54) SPECIFIC ABSORPTION RATE MITIGATIONS

(71) Applicant: Hewlett-Packard Development Company, L.P., Spring, TX (US)

(72) Inventors: Chih-Hung Chien, Taipei (TW); Chien-pai Lai, Taipei (TW); Chin-Hung Ma, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 292 days.

(21) Appl. No.: 18/263,112

(22) PCT Filed: Feb. 23, 2021

(86) PCT No.: PCT/US2021/019300
§ 371 (c)(1),
(2) Date: Jul. 26, 2023

(87) PCT Pub. No.: WO2022/182337
PCT Pub. Date: Sep. 1, 2022

(65) Prior Publication Data
US 2024/0098652 A1    Mar. 21, 2024

(51) Int. Cl.
*H04W 52/18* (2009.01)
*G06F 9/4401* (2018.01)
(Continued)

(52) U.S. Cl.
CPC ........... *H04W 52/18* (2013.01); *G06F 9/4411* (2013.01); *H04W 28/0231* (2013.01); *H04W 28/0958* (2020.05)

(58) Field of Classification Search
CPC ............... H04W 4/48; H04W 28/0231; H04W 28/0958; H04W 40/06; H04W 40/08; H04W 52/18
(Continued)

(56) References Cited

U.S. PATENT DOCUMENTS 9,622,187 B2    4/2017  Logan et al.
10,484,951 B2   11/2019 Hawaka et al.
(Continued)

FOREIGN PATENT DOCUMENTS

| CN | 106253938 A | 12/2016 |
| WO | 2019/017903 A1 | 1/2019 |
| WO | 2020/231395 A1 | 11/2020 |

*Primary Examiner* — Ajibola A Akinyemi
(74) *Attorney, Agent, or Firm* — Quarles & Brady LLP (57) ABSTRACT

In an example, a computing device may include a first radio device including a first antenna, a second radio device including a second antenna, and a basic input/output system (BIOS). The BIOS may establish a communication with the first and second radio devices. Further, the BIOS may receive first transmission status information associated with the first antenna from the first radio device and second transmission status information associated with the second antenna from the second radio device. Furthermore, the BIOS may detect a condition indicative of a combined transmit power of the first and second antennas exceeding a radio frequency exposure threshold based on the first and second transmission status information. The BIOS may instruct the first radio device, the second radio device, or both to perform a mitigation action to maintain the combined transmit power at or below the radio frequency exposure threshold.

15 Claims, 7 Drawing Sheets

(51) Int. Cl.
*H04W 28/02* (2009.01)
*H04W 28/08* (2023.01)

(58) Field of Classification Search
USPC .......................................... 455/522
See application file for complete search history.

(56) References Cited

U.S. PATENT DOCUMENTS

| | | |
|---|---|---|
| 2005/0075135 A1 | 4/2005 | Cromer et al. |
| 2009/0150084 A1* | 6/2009 | Colwell ................. G16B 50/30 702/20 |
| 2009/0275355 A1 | 11/2009 | Tan et al. |
| 2014/0370929 A1 | 12/2014 | Khawand et al. |
| 2016/0226727 A1 | 8/2016 | Thaler et al. |
| 2019/0349017 A1 | 11/2019 | Kaidar et al. |
| 2020/0015161 A1 | 1/2020 | Ramasamy et al. |
| 2020/0285737 A1* | 9/2020 | Kraus ................... G06F 21/552 |

* cited by examiner

| ANT# CONDITIONS | WWAN ANT 302A | WWAN ANT 302B | WLAN ANT 304A | WLAN ANT 304B | MITIGATION ACTION |
|---|---|---|---|---|---|
| WWAN 4G/5G STANDLONE (SA) LMHB (LOW,MID, HIGH BANDS @600MHz~2.5GHz) WLAN OFF OR DISCONNECT | TX ON | TX OFF | TX OFF | TX OFF | WWAN ANT 302A TRANSMITTING ANTENNA SELECTION (TAS) |
| WWAN 4G/5G SA UHB(ULTRA HIGH BAND @3~5GHz) WLAN OFF OR DISCONNECT | TX OFF | TX ON | TX OFF | TX OFF | WWAN ANT 302B TAS |
| WWAN 5G ENDC (LTE + NR DUAL CONNECTIVITY) WLAN OFF OR DISCONNECT | TX ON | TX ON | TX OFF | TX OFF | WWAN ENDC REDUCTION (ORIGINAL WWAN ENDC SAR MITIGATION) |
| WWAN 4G/5G SA LMHB | TX ON | TX OFF | TX ON | TX OFF | WWAN ANT 302A AND WLAN ANT 304A TAS |
| WWAN 4G/5G SA LMHB | TX ON | TX OFF | TX OFF | TX ON | WWAN ANT 302A AND WLAN ANT 304B TAS |
| WWAN 4G/5G SA LMHB | TX ON | TX OFF | TX ON | TX ON | WWAN ANT 302A,WLAN ANTS 304A and 304B TAS |
| WWAN 4G/5G SA UHB | TX OFF | TX ON | TX OFF | TX ON | WWAN ANT 302B AND WLAN ANT 304B TAS |
| WWAN 4G/5G ENDC | TX ON | TX ON | TX OFF | TX ON | WWAN ANT 302B AND WLAN ANT 304B STANDALONE TAS |

FIG. 3B

| ANT# CONDITIONS | WWAN ANT 302A | WWAN ANT 302B | WLAN ANT 304A | WLAN ANT 304B | MITIGATION STRATEGY |
|---|---|---|---|---|---|
| WWAN 4G/5G SA UHB | TX OFF | TX ON | TX ON | TX OFF | INSTRUCT WLAN DEVICE TO SWITCH TRANSMISSION TO WLAN ANT 304B TO COMPLY CO-SAR |
| WWAN 4G/5G SA UHB (MOBILE HOTSPOT CONDITION) | TX OFF | TX ON | TX ON | TX ON | INSTRUCT WLAN DEVICE TO SWITCH TRANSMISSION FROM ANTS 304A AND 304B TO ANT 304B (OR) INSTRUCT WLAN DEVICE TO USE ANTS 304A and 304B + WWAN DEVICE TO USE WWAN ANT 302B BY COMPLYING WITH CO-SAR TABLE |
| WWAN 4G/5G SA UHB (FOR EXTREME HIGH SPEED CONNECTION TO AGGRAGATE WLAN + WWAN SPEED) | TX OFF | TX ON | TX ON | TX ON | INSTRUCT WWAN DEVICE AND WLAN DEVICE TO REDUCE TRANSMISSION POWER TO THE CO-SAR LEVEL |
| WWAN 4G/5G ENDC | TX ON | TX ON | TX ON | TX OFF | INSTRUCT WLAN DEVICE TO SWITCH TRANSMISSION FROM ANT 304A TO ANT 304B |
| WWAN 4G/5G ENDC (MOBILE HOTSPOT) | TX ON | TX ON | TX ON | TX ON | INSTRUCT WLAN DEVICE TO SWITCH TRANSMISSION FROM ANTS 304A AND 304B TO ANT 304B |
| WWAN 4G/5G ENDC (EXTREME HIGH SPEED CONNECTION TO AGGRAGATE WLAN+WWAN SPEED) | TX ON | TX ON | TX ON | TX ON | INSTRUCT WWAN DEVICE AND WLAN DEVICE TO TRANSMIT ACCORDING TO THE CO-SAR TAS LEVEL |

SPECIFIC ABSORPTION RATE MITIGATIONS

BACKGROUND

Computing devices such as notebook computers, tablets, and mobile phones are equipped with wireless communication devices for wireless wide area network (WWAN), wireless local area network (WLAN), and the like. In such computing devices, various radio access technologies are combined into a small form factor. For example, different radio access technologies may be used to simultaneously allow a user to engage in different forms of wireless communication activities. The radio access technologies may incorporate multiple antennas to support various wireless subsystems and communications. For example, the antennas may include cellular antennas, wireless fidelity (Wi-Fi) antennas, Bluetooth antennas, global navigation satellite system (GNSS) antennas, and/or near field communication (NEC) antennas.

BRIEF DESCRIPTION OF THE DRAWINGS

Examples are described in the following detailed description and in reference to the drawings, in which.

DETAILED DESCRIPTION

As mobile computing infrastructure evolves to enable computing devices to transmit and receive significant amount of data while on the move, the abilities of the computing devices to receive and transmit various signals simultaneously increase in demand. The computing devices may employ multiple radio devices for communication via wireless links operating on a variety of radio access technologies. For example, a computing device may employ separate radio devices for wireless wide area network (WWAN) signals and wireless local area network (WLAN) signals.

Example WWAN signals may include 2G standards such as global system for mobile communications (GSM), 2.5G standards such as general packet radio service (CPRS), 3G standards such as wideband code-division multiple access (W-CDMA), 4G standards such as long-term evolution (LTE), emerging 5G standards, or worldwide interoperability for microwave access (WiMAX), small cell WWAN, and the like. Example WLAN signals may include wireless links adhering to standards such as, for example, wireless fidelity (Wi-Fi), wireless gigabit alliance (WiGig), and/or wireless personal area network (WPAN). In other examples, several radio devices may be available for each radio access technology to enable aggregated data communications such as via plural multiple in, multiple out (MIMO) streams to enhance bandwidth or reliability.

In such computing devices, several radio access functions could transmit at the same time, for example, Wi-Fi and WWAN (e.g., a cellular network) could have transmission at the same time in a mobile hotspot mode. For safety concerns, specific absorption rate (SAR) tests may have to be conducted with the above two functions to be transmitted at the same time. In such instances, regional regulators may try to measure a combined SAR (CO-SAR), while multiple antennas simultaneously transmitting different signals are placed in close proximity to one another. The SAR is a measure of an amount of electromagnetic energy absorbed in a human body per unit time per unit mass when using a computing device (e.g., a phone, a tablet, or the like).

Further, an antenna may be a device that emits or receives radio waves. The antenna may be used with a transmitter of a radio device. The transmitter may generate a radio signal, which may be an alternating current. The antenna may emit the radio signal as electromagnetic energy termed radio waves. The antenna may also be used with a receiver of the radio device. The receiver may receive a radio signal from the antenna and convert the information carried by the radio signal into a usable form. The radio device including both the transmitter and the receiver may be termed as a transceiver.

Some computing devices may include multiple antennas to communicate with multiple different wireless networks. For instance, a computing device, such as a laptop, may include a WWAN antenna to communicate with a wide area network (WAN) and a WLAN antenna to communicate with a local area network (LAN).

Further, configurations involving multiple radio devices operating on a variety of radio access technologies may encounter problems associated with interference between each of the antennas, compliance with Federal Communications Commission (FCC) SAR guidelines across the antennas, and/or the like. The radio devices may not be capable of communicating directly with each other as the radio devices may not have an electrical interface or a programming interface to support the communication. With no mutual communication between the radio devices, one radio device may read transmission power back off values from a basic input/output system (BIOS) during a standalone operation, while another radio device may be backing off power based on sensor triggers during the standalone operation involving SAR exposure. During a simultaneous transmission, there is no intelligent means to cut back transmission power in a coherent manner rather than in an ad-hoc manner. Since there is no central control mechanism for such radio devices, some example methods may limit a transmission output power of each radio access technology based on the combined SAR condition even when one radio device is transmitting.

In another example, the combined SAR may be reduced by increasing a distance between the antennas in the computing device, During a design or manufacturing phase, the transmitting antennas may have to be separated from each other to avoid multiple hot spots in close proximity. However, separating the antennas may result in an increased form factor of the computing device.

In yet another example, the transmission output power of the radio devices may have to be reduced significantly to meet the SAR compliance. However, reducing the transmission output power may result in shortening of a transmission range or degradation of a wireless performance, thereby affecting the user experience.

Examples described herein may provide a computing device including a controller to coordinate different radio devices of the computing device and determine a mitigation action to implement for the computing device to achieve an enhanced performance while meeting a radio frequency exposure compliance. In an example, the controller may establish a communication with a first radio device (e.g., a WLAN device) and a second radio device (e.g., a WWAN device), for instance, via a first driver and a second driver, respectively. Further, the controller may receive first transmission status information associated with a first antenna from the first radio device via the first driver and second transmission status information associated with a second antenna from the second radio device via the second driver.

Furthermore, the controller may detect a condition indicative of a combined transmit power of the first antenna and the second antenna exceeding a radio frequency exposure threshold based on the first and second transmission status information. In an example, the controller may detect the condition using a look-up table. Also, the controller may instruct the first radio device, the second radio device, or both to perform a mitigation action to maintain the combined transmit power at or below the radio frequency exposure threshold in response to the detection.

Thus, examples described herein may utilize defined mitigation actions corresponding to detected conditions in the look-up table to set suitable antenna transmission powers and/or suitable antenna location configurations. The defined mitigation actions may distribute the SAR associated with individual antennas into different areas in space, thereby reducing the CO-SAR. Examples described herein may be implemented in computing devices having multiple radio access technologies as well as in computing devices having a standalone radio access technology having multiple transmitting antennas.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Figure 1A:
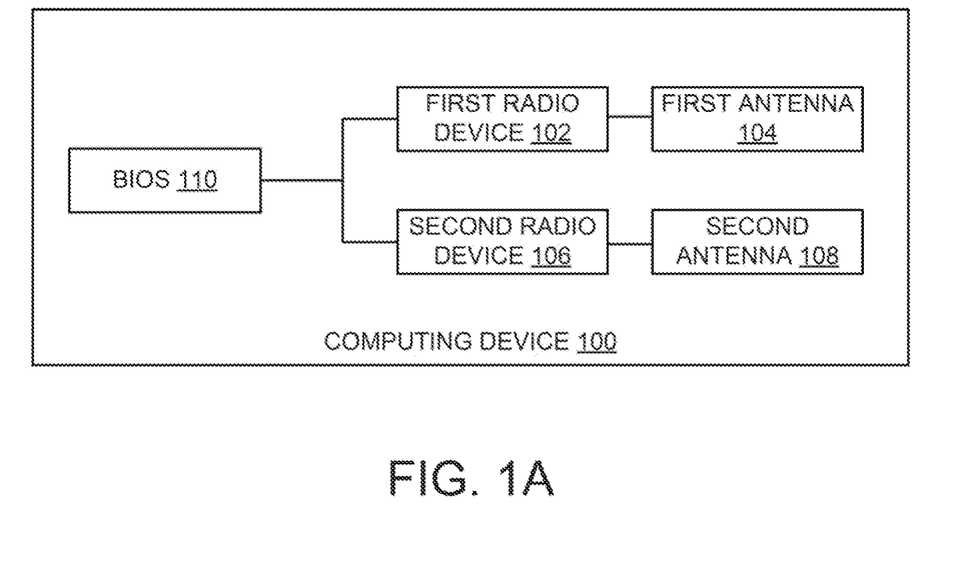
FIG. 1A is a block diagram of an example computing device, including a basic input/output system (BIOS) to determine and send a mitigation action for a first radio device and/or a second radio device.

Turning now to the figures, FIG. 1A is a block diagram of an example computing device 100, including a basic input/output system (BIOS) 110 to determine and send a mitigation action for a first radio device 102 and/or a second radio device 106. Example computing device 100 may include a notebook, a tablet, a personal computer (PC), a smart phone, a gaming laptop, a workstation, or the like.

Computing device 100 may include first radio device 102 including a first antenna 104. Further, computing device 100 may include second radio device 106 including a second antenna 108. For example, first antenna 104 and second antenna 108 may include a dipole antenna, monopole antenna, patch antenna, loop antenna, microstrip antenna, or any other type of antenna suitable for transmission of radio frequency signals. In some examples, first antenna 104 and second antenna 108 can be tuned to transmit signals over multiple frequency bands.

In an example, first radio device 102 may be a WLAN device to establish a WLAN connection, and second radio device 106 may be a WWAN device to establish a WWAN connection. In this example, second antenna 108 (e.g., a WWAN antenna) may be operable to receive and transmit WWAN radio frequency signals. Further, the WWAN device may be operable to process the WWAN radio frequency signals from the WWAN antenna and/or generate and output WWAN radio frequency signals to the WWAN antenna to send out. First antenna 104 (e.g., a WLAN antenna) may be operable to receive and transmit WLAN radio frequency signals. The WLAN device may be operable to process the WLAN radio frequency signals from the WLAN antenna and/or generate and output. WLAN radio frequency signals to the WLAN antenna to send out. In other examples, first radio device 102 or second radio device 106 may be a WPAN device to establish a WPAN connection (e.g., a Bluetooth, Ultra-Wideband (UWB), ZigBee, or the like), a wireless metropolitan area network (WMAN), or the like. For example, each of first radio device 102 and second radio device 106 may include hardware components such as a radio frequency subsystems with a transmitter and/or receiver circuit, a modem circuit, a unified radio frequency front end circuit, a wireless controller circuit, an amplifier, another radio frequency subsystem circuit for wireless communications via multiple radio access technologies, or any combination thereof.

Furthermore, computing device 100 may include BIOS 110. As used herein, BIOS 110 refers to hardware or hardware and instructions to initialize, control, or operate computing device 100 prior to execution of an operating system (OS) of computing device 100. Instructions included within BIOS 110 may be software, firmware, microcode, or other programming that defines or controls functionality or operation of BIOS 110. In an example, BIOS 110 may be implemented using instructions, such as platform firmware of computing device 100, executable by a processor. BIOS 110 may operate or execute prior to the execution of the OS of computing device 100. BIOS 110 may initialize, control, or operate components such as hardware components of computing device 100 and may load or boot the OS of computing device 100.

In some examples, BIOS 110 may provide or establish an interface between hardware devices or platform firmware of computing device 100 and the OS of computing device 100, via which the OS of computing device 100 may control or operate hardware devices or platform firmware of computing device 100. In some examples, BIOS 110 may implement the Unified Extensible Firmware Interface (UEFI) specification or another specification or standard for initializing, controlling, or operating computing device 100. Computing device 100 may include other components such as a processor, memory, camera, audio/video devices, and the like, depending on the functions of computing device 100.

During operation, BIOS 110 may establish a communication with first radio device 102 and second radio device 106. In an example, BIOS 110 may establish the communication with first radio device 102 and second radio device 106 via an advanced configuration and power interlace (ACPI) specification. The ACPI specification may specify how BIOS 110, the OS, and peripheral devices communicate with each other. To implement the ACPI specification on computing device 100, BIOS 110 may have to include an ACPI instructions and the OS may have to be ACPI-compatible.

In another example, BIOS 110 may establish the communication with first radio device 102 and second radio device 106 via a hardware interface. For example, the hardware interface may include an inter-integrated circuit (I2C) interface, a universal asynchronous receiver transmitter (DART) interface, a serial peripheral interface (SPI), an inter-integrated circuit sound (I2S) interface, or an improved inter integrated circuit (I3C) interface.

Further, BIOS 110 may receive first transmission status information associated with first antenna 104 from first radio device 102. The first transmission status information may include information about a location, a transmitting frequency band type, and a transmission power level of first antenna 104. Also, the first transmission status information may include information indicating whether first antenna 104 is transmitting radio frequency signals or not. In other examples, when radio device 102 is connected to multiple antennas, BIOS 110 may receive transmission status information associated with the multiple antennas from first radio device 102.

Furthermore. BIOS 110 may receive second transmission status information associated with second antenna 108 from second radio device 106. The second transmission status information may include information about a location, a transmitting frequency band type, and a transmission power level of second antenna 108. Also, the second transmission status information may include information indicating whether second antenna 108 is transmitting radio frequency signals or not. In other examples, when second radio device 106 is connected to multiple antennas, BIOS 110 may receive transmission status information associated with the multiple antennas from second radio device 106.

Further. BIOS 110 may detect a condition indicative of a combined transmit power of first antenna 104 and second antenna 108 exceeding a radio frequency exposure threshold based on the first and second transmission status information. The radio frequency exposure threshold may be associated with a regional specific absorption rate (SAR) or a power density. In an example, the condition indicative of the combined transmit power exceeding the radio frequency exposure threshold is determined based on which antennas are transmitting, the frequency bands used by the antennas, the transmission power levels, or any combination thereof.

Furthermore, BIOS 110 may instruct first radio device 102, second radio device 106, or both to perform a mitigation action to maintain the combined transmit power at or below the radio frequency exposure threshold in response to the detection. In other examples, when first radio device 102 and second radio device 106 are connected to a first set of antennas and a second set of antennas, BIOS 110 may receive transmission status information associated with the first and second sets of antennas and determine the mitigation action based on the received status information.

In an example, BIOS 110 may instruct first radio device 102, second radio device 106, or both to modify a transmission power level of first antenna 104, second antenna 108, or both, respectively, to comply with the radio frequency exposure threshold. In this example, the mitigation action may include an amount of power reduction to implement for first antenna 104, second antenna 108, or both to maintain SAR (e.g., a time-average SAR) compliance. For example, BIOS 110 may instruct first radio device 102 and second radio device 106 to reduce the transmission power level of first antenna 104 and second antenna 108, respectively, to reduce the combined transmit power less than or equal to the radio frequency exposure threshold.

In another example, BIOS 110 may instruct first radio device 102 or second radio device 106 to switch transmission from first antenna 104 or second antenna 108, respectively, to a third antenna to comply with the radio frequency exposure threshold. For example, consider that first radio device 102 is connected to first antenna 104 and the third antenna. Also, consider that first antenna 104 and second antenna 108 are transmitting different signals simultaneously and are in close proximity to each other. In this scenario. BIOS 110 may detect a condition indicative of a high-speed connection for computing device 100. In this example, BIOS 110 may instruct first radio device 102 to switch the transmission to the third antenna (e.g., disable transmission via first antenna 104 and enable transmission via the third antenna).

Figure 1B:
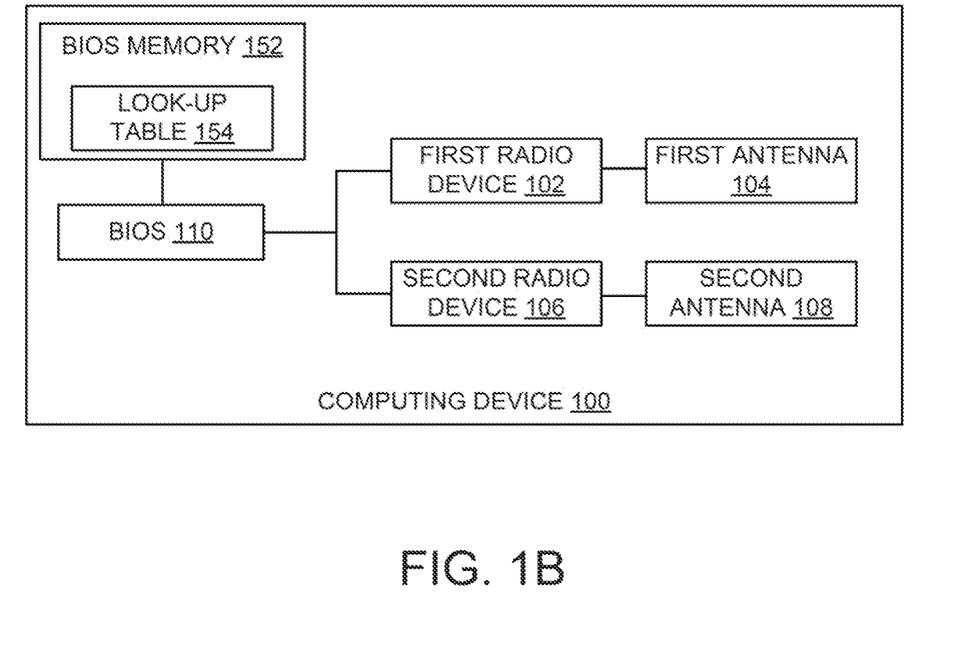
FIG. 1B is a block diagram of the example computing device of FIG. 1A, depicting additional features.

FIG. 1B is a block diagram of example computing device 100 of FIG. 1A, depicting additional features. For example, similarly named elements of FIG. 1B may be similar in structure and/or function to elements described with respect to FIG. 1A, As shown in FIG. 1B, computing device 100 may include BIOS memory 152 to store a look-up table 154. In some examples, look-up table 154 may be stored in BIOS memory 152 or in any other storage device that can be accessible by BIOS 110.

In an example, look-up table 154 may be created by considering information about transmitting antennas (e.g., antennas 104 and 108) obtained from radio devices (e.g., radio devices 102 and 106) that are supported on computing device 100, Further, look-up table 154 may be generated during a test phase by establishing communication via different combinations of wireless links operating on various radio access technologies, changing frequency bands in each combination, measuring transmission power levels of the antennas in each combination, and the like. Look-up table 154 may describe optimized configurations for radio devices 102 and 106 corresponding to different conditions indicative of the combined transmit power exceeding the radio frequency exposure threshold.

For example, look-up table 154 may associate different conditions indicative of the combined transmit power exceeding the radio frequency exposure threshold with various mitigation actions. In an example, a mitigation action may include an optimized configuration such as power reduction values to be applied to a signal transmitted via first antenna 104 and/or second antenna 108 corresponding to a condition described by a combination of transmission status information. The amount of transmission power reduction may vary for different mitigation actions based upon a current transmission power, a transmitting frequency band type, and/or the like of antennas 104 and 108.

In another example, the mitigation action may include an optimized configuration such as transmitting antenna switching (i.e., switching transmission from one antenna to another) to be applied to first radio device 102 or second radio device 106 corresponding to a condition described by the combination of transmission status information. During operation, BIOS 110 may determine the mitigation action to be sent to the first radio device 102 and/or second radio device 106 using look-up table 154. Even though FIGS. 1A-1C are described herein using two radio devices, examples described herein may determine the mitigation action corresponding to received transmission status information from any number of radio devices. In other examples, the functions/operations described in FIGS. 1A and 1B may also be implemented using an MCU.

Figure 2A:
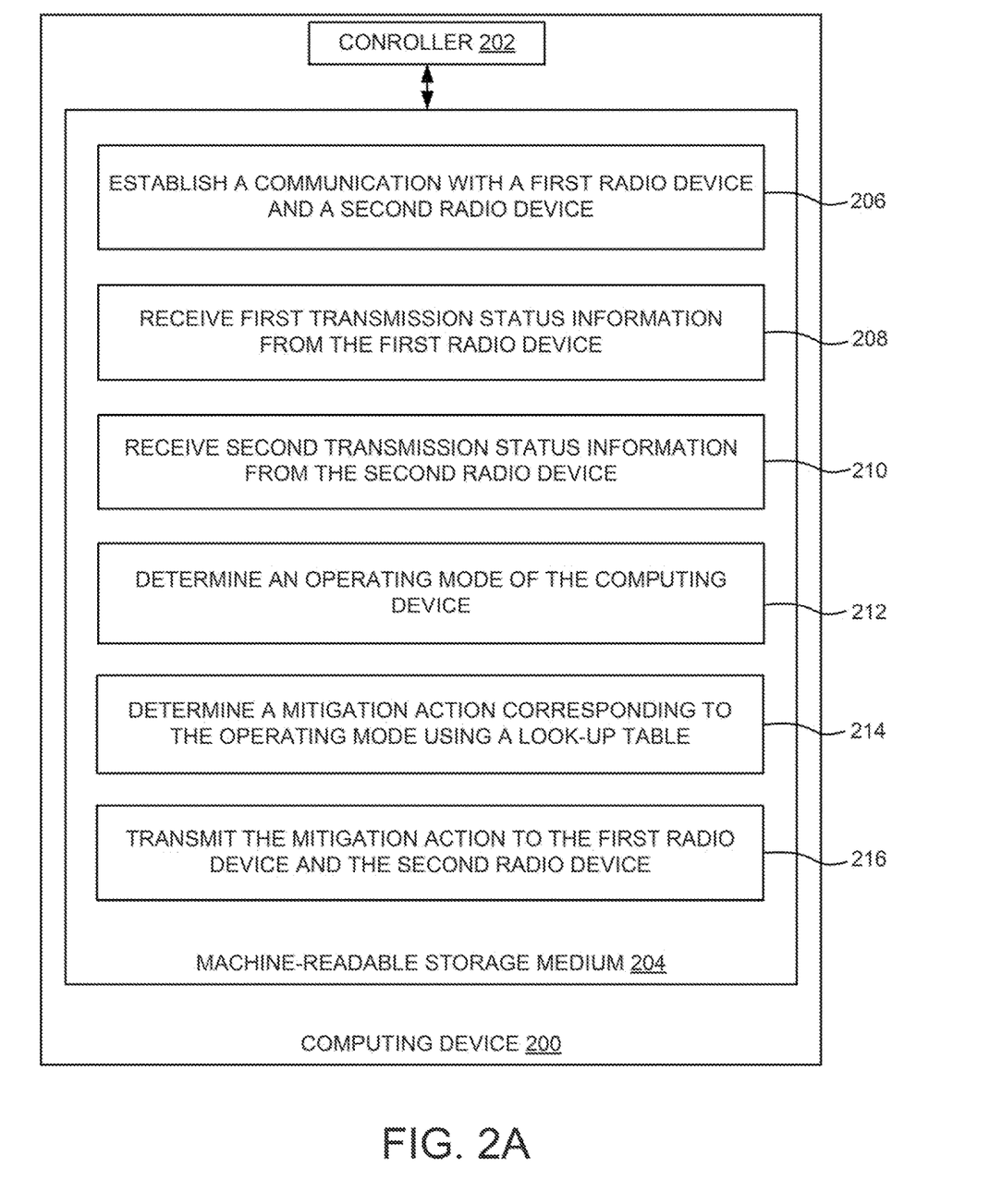
FIG. 2A is a block diagram of an example computing device including a non-transitory machine-readable storage medium, storing instructions to determine a mitigation action corresponding to an operating mode of the computing device.

FIG. 2A is a block diagram of an example computing device 200 including a non-transitory machine-readable storage medium 204, storing instructions to determine a mitigation action corresponding to an operating mode of computing device 200. Computing device 200 (e.g., a wireless device) may include a controller 202 and machine-readable storage medium 204 communicatively coupled through a system bus. Controller 202 may be any type of central processing unit (CPU), microprocessor, or processing logic that interprets and executes machine-readable instructions stored in machine-readable storage medium 204. In an example, controller 202 may be a BIOS chip, for instance, in case of notebook computers. In another example, controller 202 may be a microcontroller unit (MCU), for instance, in case of customer-premises equipment (CPE) device, a smartphone, or the Dike. The MCU may be an integrated circuit designed to govern a specific operation in computing device 200. Further, the MCU may include a processor, memory and input/output (I/O) peripherals on a single chip.

Machine-readable storage medium 204 may be a random-access memory (RAM) or another type of dynamic storage device that may store information and machine-readable instructions that may be executed by controller 202. For example, machine-readable storage medium 204 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 204 may be a non-transitory machine-readable medium, where the term "non-transitory" does not encompass transitory propagating signals. In an example, machine-readable storage medium 204 may be remote but accessible to computing device 200.

Machine-readable storage medium 204 may store instructions 206-216. In an example, instructions 206 may be executed by controller 202 to establish a communication with a first radio device and a second radio device of computing device 200 via a first driver and a second driver, respectively. For example, the first radio device may establish a wireless local area network (WLAN) connection, and the second radio device may establish a wireless wide area network (WWAN) connection.

In an example, the first driver and the second driver may comply with an ACPI specification. The terms "first driver" and "second driver" may refer to instructions executable by a processor of computing device 200 to run and configure the first radio device and the second radio device, respectively. For example, a WLAN driver may refer to processor-executable instructions to enable computing device 200 to run and configure a WLAN device and a WWAN driver may refer to processor-executable instructions to enable computing device 200 to run and configure a WWAN device.

Instructions 208 may be executed by controller 202 to receive first transmission status information associated with a first antenna from the first radio device, for instance, via the first driver. Instructions 210 may be executed by controller 202 to receive second transmission status information associated with a second antenna from the second radio device, for instance, via the second driver. In this example, the first driver and the second driver may call an ACPI interlace and send the first transmission status information and the second transmission status information from the first radio device and the second radio device to controller 202.

In an example, the first driver and the second driver may initiate the mitigation process, check corresponding transmitting antennas' configuration at regular intervals (e.g., 2 secs) to fit regulatory guidelines when corresponding antennas are transmitting, and send the corresponding transmitting antennas' configuration as the transmission status information to controller 202 via ACPI commands. Also, the first and second drivers may inform controller 202 when the corresponding antennas are not transmitting, idle, or radio device off state, which helps controller 202 to give priority to other radio devices. Further, controller 202 may receive the ACPI commands including the transmission status information of the antennas from the first and second drivers.

Instructions 212 may be executed by controller 202 to determine an operating mode of computing device 200 using the first transmission status information and the second transmission status information. In an example, the operating mode is indicative of an activation of a wireless communication feature on computing device 200. For example, the wireless communication feature may be a mobile hotspot, a type of wireless connection (e.g., a high-speed connection), multi-radio access technologies transmission, or the like.

Instructions 214 may be executed by controller 202 to determine a mitigation action corresponding to the operating mode of computing device 200 using a look-up table. An example look-up table depicting mapping information between different operating modes and corresponding mitigation actions is shown in FIGS. 3B and 3C. The mitigation action, upon implementation, may maintain a radio frequency exposure compliance of computing device 200. In an example, instructions to determine the mitigation action may include instructions to determine the mitigation action to reduce a transmission power level of the first antenna, the second antenna, or both to comply with a radio frequency exposure threshold. The radio frequency exposure threshold is associated with a regional SAR or a power density.

In another example, instructions to determine the mitigation action may include instructions to determine the mitigation action to switch transmission from the first antenna or the second antenna to a third antenna to comply with the radio frequency exposure threshold. Instructions 216 may be executed by controller 202 to transmit the mitigation action to the first radio device and the second radio device.

In an example, controller 202 may send the ACPI commands to confirm the radio devices' transmission power scenario without any change or to modify the radio devices' transmission power scenario. Further, the first and second drivers may receive the ACPI commands from controller 202 and send the ACPI commands to a firmware associated with the first radio device and the second radio device, respectively. The firmware associated with the first radio device and the second radio device may control associated hardware circuits (e.g., amplifiers, transceivers, baseband processors, a unified radio frequency front end circuit, and/or the like) to control an actual transmission power. Further, the firmware associated with the first radio device and the second radio device may report the transmission antenna status (e.g., acknowledged or not acknowledged) to associated drivers and the drivers report the transmission antenna status to controller 202 through the ACPI commands.

In some example a driver and a firmware associated with a radio device may have to enable a failsafe mechanism to prevent controller 202 malfunction. In such scenarios, when there is no response or ACPI command from controller 202, the radio device may fallback the transmission power to a low transmission power state to comply with the SAR condition.

In other examples, the drivers may also monitor current transmission speed to inform to controller 202. For example, in the mobile hotspot mode, when the WWAN device speed exceeds a throughput that can be handled by a WLAN antenna, then the WLAN device cannot be fallback from using 2 antenna transmission to 1 antenna transmission. In a use case of a computing device managing multiple internet protocol (IP) connections from different radio devices, in order to get extreme throughput, the WLAN device may have to use two transmitting antennas and use a power reduction based on 2 antenna transmission scenario.

Figure 2B:
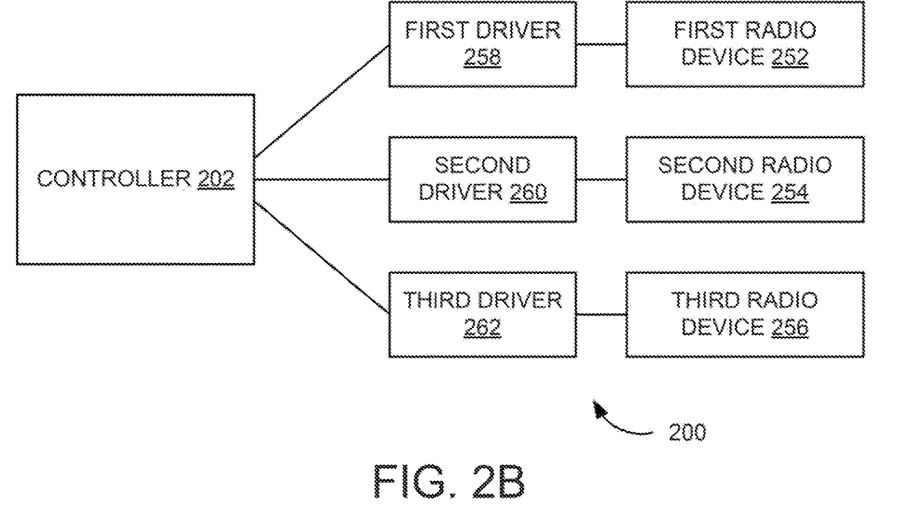
FIG. 2B is a block, diagram of the example computing device of FIG. 2A, depicting a controller communicating with multiple radio devices via corresponding drivers.

FIG. 2B is a block diagram of example computing device 200 of FIG. 2A, depicting controller 202 communicating with radio devices (e.g., radio devices 252, 254, and 256) via corresponding drivers (e.g., drivers 258, 260, and 262). For example, similarly named elements of FIG. 2B may be similar in structure and/or function to elements described with respect to FIG. 2A. As shown in FIG. 2B, controller 202 may communicate with a first radio device 252, a second radio device 254, and a third radio device 256 via a first driver 258, a second driver 260, and a third driver 262, respectively. To establish the communication between the radio devices 252, 254, and 256 and controller 202, SAR related ACPI commands that support BIOS ACPI queries may have to be added to drivers 258, 260, and 262.

In an example, first radio device 252 may be a MILAN device (e.g., that may establish a Wi-Fi connection, a Bluetooth connection, or the like), second radio device 254 may be a WWAN device (e.g., that may establish a cellular connection), and a third radio device 256 may be a WPAN device (e.g., that may establish a WPAN connection). During operation, controller 202 may communicate with drivers 258, 260, and 262 through ACPI commands to obtain SAR related transmission status information of antennas from radio devices 252, 254, and 256 and send SAR related mitigation actions to radio devices 252, 254, and 256. In other examples, controller 202 may communicate with radio devices 252, 254, and 256 via a hardware interface (e.g., an I2C, UART, SPI, I2S, I3C, or any other low speed interface that controller 202 can send commands).

Figure 3A:
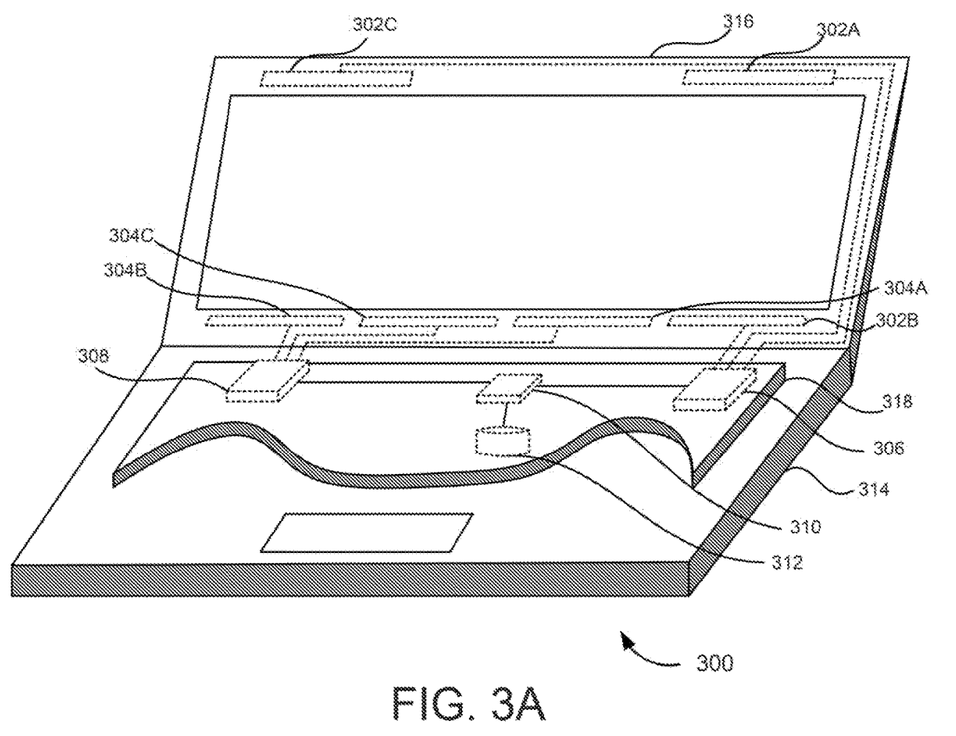
FIG. 3A is a schematic representation of an example computing device, depicting a BIOS to send a mitigation action to a WLAN device and/or a WWAN device.
Figure 3B:
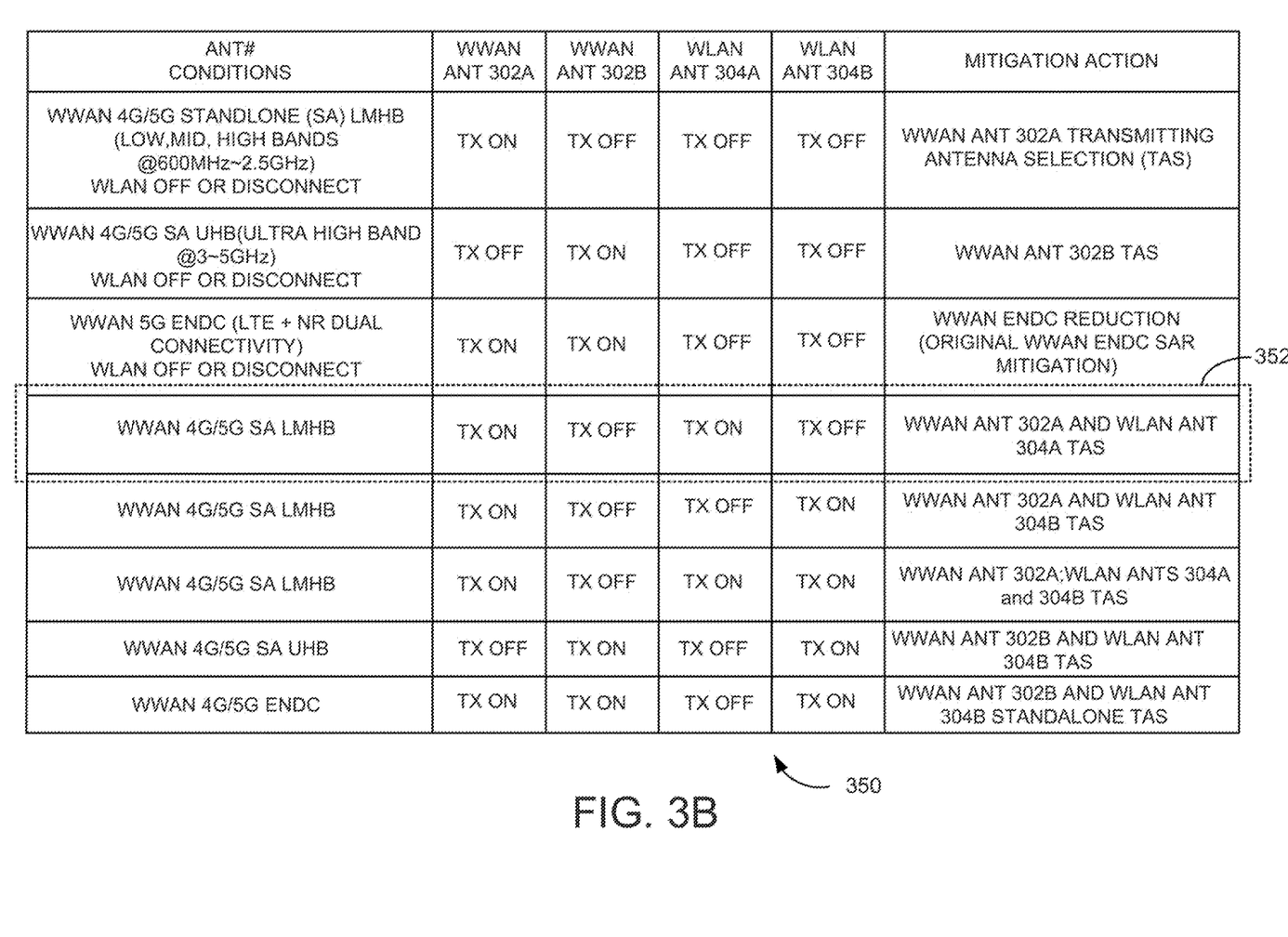
FIG. 3B depicts an example look-up table for the computing device of FIG. 3A, including mapping information to map mitigation actions with transmission status information associated with multiple transmitting antennas.
Figure 3C:
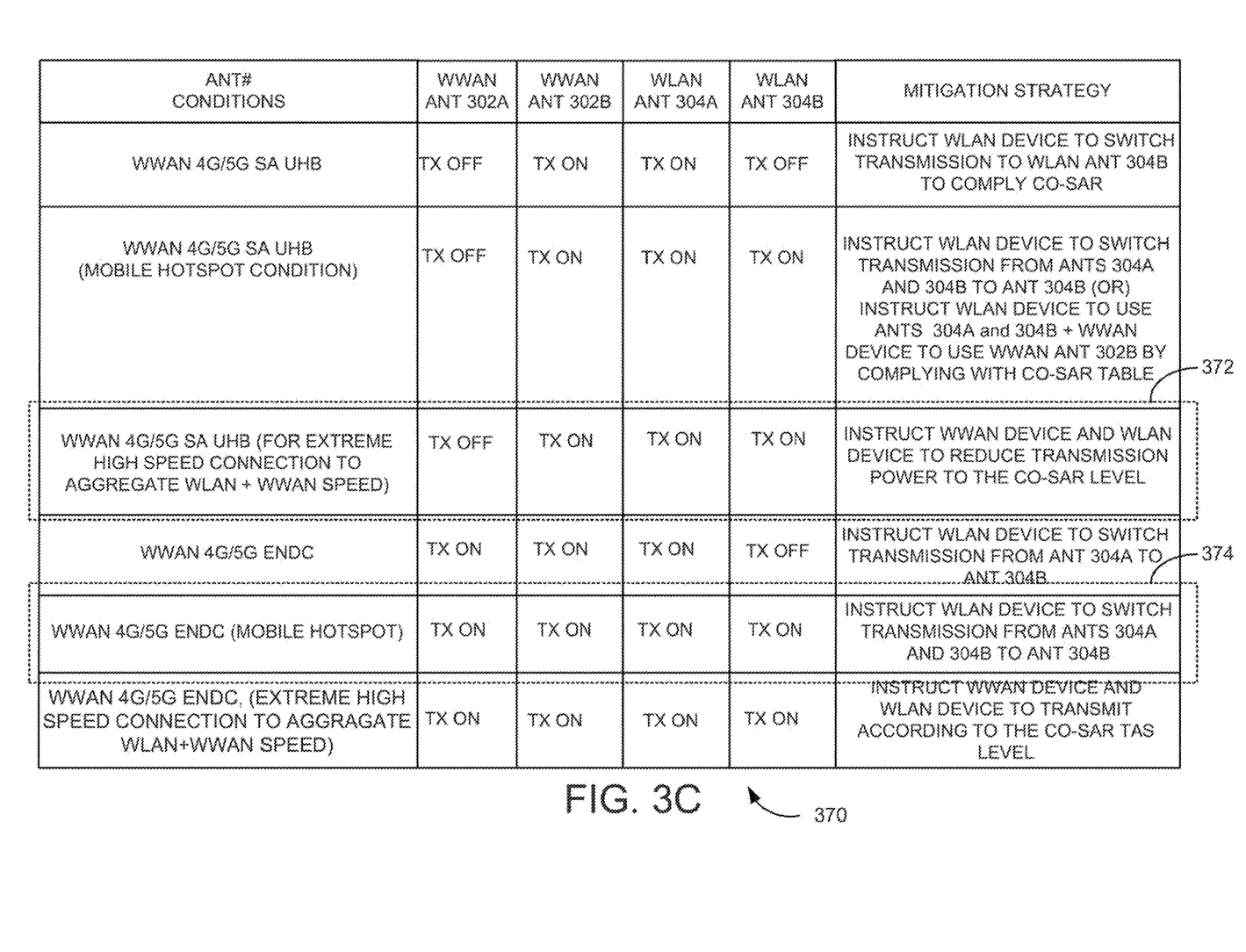
FIG. 3C depicts another example look-up table for the computing device of FIG. 3A, including mapping information to map mitigation actions with transmission status information associated with multiple transmitting antennas.

FIG. 3A is a schematic representation of an example computing device 300, depicting a BIOS 310 to send a mitigation action to a WLAN device 308 and/or a WWAN device 306. Example computing device 300 may be a personal computer, a notebook computer, a tablet computer, a convertible device, a personal gaming device, and the like. Example convertible device may refer to a device that can be "convertible" from a laptop mode to a tablet mode.

Computing device 300 may include WWAN antennas 302A, 302B, and 302C. In the example shown in FIG. 3A, WWAN antennas 302A and 302B may be configured as transmitting antennas to transmit WWAN radio frequency signals and WWAN antenna 302C may be configured as a receiving antenna to receive WWAN radio frequency signals. Further, computing device 300 may include WWAN device 306 connected to WWAN antennas 302A, 302B, and 302C. Further, computing device 300 may include WLAN antennas 304A, 304B, and 304C. In an example, WLAN antennas 304A and 304B may be configured as transmitting antennas to transmit WLAN radio frequency signals and WLAN antenna 304C may be configured as a receiving antenna to receive WLAN radio frequency signals. Further, computing device 300 may include WLAN device 308 connected to WLAN antennas 304A, 304B, and 304C.

Further, computing device 300 may include BIOS 310 to boot up computing device 300 and to store a look-up table. The look-up table may be used to map mitigation actions to various operating modes of computing device 300. Example look-up table may be stored in a database 312 of computing device 300 and include mitigation actions indexed according to various operating modes of computing device 300. In other words, the look-up table may be used to map the mitigation actions to various combinations of antenna status information (e.g., antenna configurations) of WWAN antennas 302A and 302B and WLAN antennas 304A and 304B.

In the example shown in FIG. 3A, computing device 300 may be a laptop computer having a base housing 314 and a display housing 316 that may be rotatably, detachably, or twistably connected to base housing 314. For example, base housing 314 may house a keyboard, a battery, a touchpad, and so on. Display housing 316 may house a display panel (e.g., a touchscreen display panel), Example display panel may include liquid crystal display (LCD), light emitting diode (LED), electro-luminescent (EL) display, or the like. In other examples, display housing 316 and base housing 314 may house other components such as a camera, audio/video devices, and the like, depending on the functions of computing device 300.

In the example shown in FIG. 3A, antennas 302A-302C and 04A-304C may be disposed in display housing 316. Further, base housing 314 may include a motherboard 318 (e.g., a printed circuit board). As shown in FIG. 3A, WLAN device 308, WWAN device 306, and BIOS 310 may be disposed on motherboard 318.

During operation, BIOS 310 may receive antenna status information associated with transmitting WLAN antennas 304A and 304B from WLAN device 308, for instance, via ACPI commands. Further, BIOS 310 may receive antenna status information associated with transmitting WWAN antennas 302A and 302B from WWAN device 306, for instance, via the ACPI commands.

Further, BIOS 310 may determine an operating mode indicative of an activation of a wireless communication feature that corresponds to the received antenna status information associated with WLAN antennas 304A and 304B and WWAN antennas 302A and 302B. The activation of the wireless communication feature may be indicative of a radio frequency exposure of computing device 300 exceeding a threshold. Further, BIOS 310 may map the determined operating mode with a stored operating mode in the look-up table to determine a corresponding mitigation action. An example look-up table is explained with respect to FIGS. 3B and 3C.

FIG. 38 depicts an example look-up table 350 for computing device 300 of FIG. 3A, including mapping information to map mitigation actions with transmission status information associated with multiple transmitting antennas (e.g., WWAN antennas 302A and 302B and WLAN antennas 304A and 304E of Fla 3A). In the example shown in FIG. 3A, transmitting antennas 302B and 304A are located in close proximate to each other. Therefore, a combined transmit power of antennas 302B and 304A may be considered in determining a condition indicative of a radio frequency exposure of computing device 300 is above a threshold.

In example look-up table 350 shown in FIG. 38, the received antenna status information indicates that either WWAN antenna 302B or WLAN antenna 304A is used to transmit the radio frequency signals either alone or in combination with other antennas (i.e., WWAN antenna 302A and/or WLAN antenna 304B). Since there is no Co-SAR concern, BIOS 310 may instruct WLAN device 308 and WWAN device 306 to implement their own mitigation strategies. For example, as shown in 352 of look-up table 350, the received status information indicates that the transmission occurs on WWAN antenna 302A and WLAN antenna 304A. In the example shown in FIG. 3A, since WWAN antenna 302A and WLAN antenna 304A are not in close proximate to each other, there is no CO-SAR concern. Therefore, BIOS 310 may instruct WLAN device 308 or WWAN device 306 to implement an own mitigation strategy associated with WLAN device 308 or WAN device 306.

FIG. 3C depicts another example look-up table 370 for computing device 300 of FIG. 3A, including mapping information to map mitigation actions with transmission status information associated with multiple transmitting antennas (e.g., WWAN antennas 302A and 302B and WLAN antennas 304A and 304B). In example look-up table 370 shown in FIG. 3C, the received antenna status information indicates that. WWAN antenna 302B and WLAN antenna 304A are used to simultaneously transmit the radio frequency signals. In this example, the radio frequency exposure of computing device 300 may exceed the threshold.

Therefore, BIOS 310 may determine a mitigation action based on transmission status information received from antennas 302A, 302B, 304A, and 304B. Further, BIOS 310 may instruct WLAN device 308 and/or WWAN device 306 to implement the determined mitigation action. For example, as shown in 372 of look-up table 370, the received status information indicates that the transmission occurs on WWAN antenna 302B, and WLAN antennas 304A and 304B. In this example, since the WWAN antenna 302B and WLAN antenna 304A are in close proximate to each other, there might be a CO-SAR concern. In this example, BIOS 310 may determine the operating mode of computing device 300 as involving a high-speed connection based on received transmission status information (e.g., an antenna location, a transmitting frequency band type, and a transmission power level) of antennas 302A, 302B, 304A and 304B. Further, BIOS 310 may determine a mitigation action corresponding to the operating mode using look-up table 370. In the example shown in 372, BIOS 310 may instruct WWAN device 306 and WLAN device 308 to reduce the transmission power level to comply with the CO-SAR condition.

In another example shown in 374 of look-up table 370, the received status information indicates that the transmission occurs on WWAN antennas 302A and 302B, and WLAN antennas 304A and 304B. In this example, since the WWAN antenna 302B and WLAN antenna 304A are in close proximate to each other, there might be a CO-SAR concern. In this example, BIOS 310 may determine the operating mode of computing device 300 as a mobile hotspot mode based on received transmission status information of antennas 302A, 302B, 304A and 304B, Further, BIOS 310 may determine a mitigation action corresponding to the determined operating mode using look-up table 370. In the example shown in 372, BIOS 310 may instruct WLAN device 308 to switch transmission from two antennas 304A and 304E to one antenna 304B to comply with the CO-SAR condition. Thus, different mitigation actions can be implemented for different conditions or operating modes of computing device 300. Even though look-up tables 350 and 370 in FIGS. 3B and 3C are described using four antennas 302A, 302B, 304A, and 304B associated with corresponding one of two radio devices 306 and 308, the look-up table can also be generated for any number of antennas corresponding to various radio access technologies that can operate simultaneously.

Figure 4:
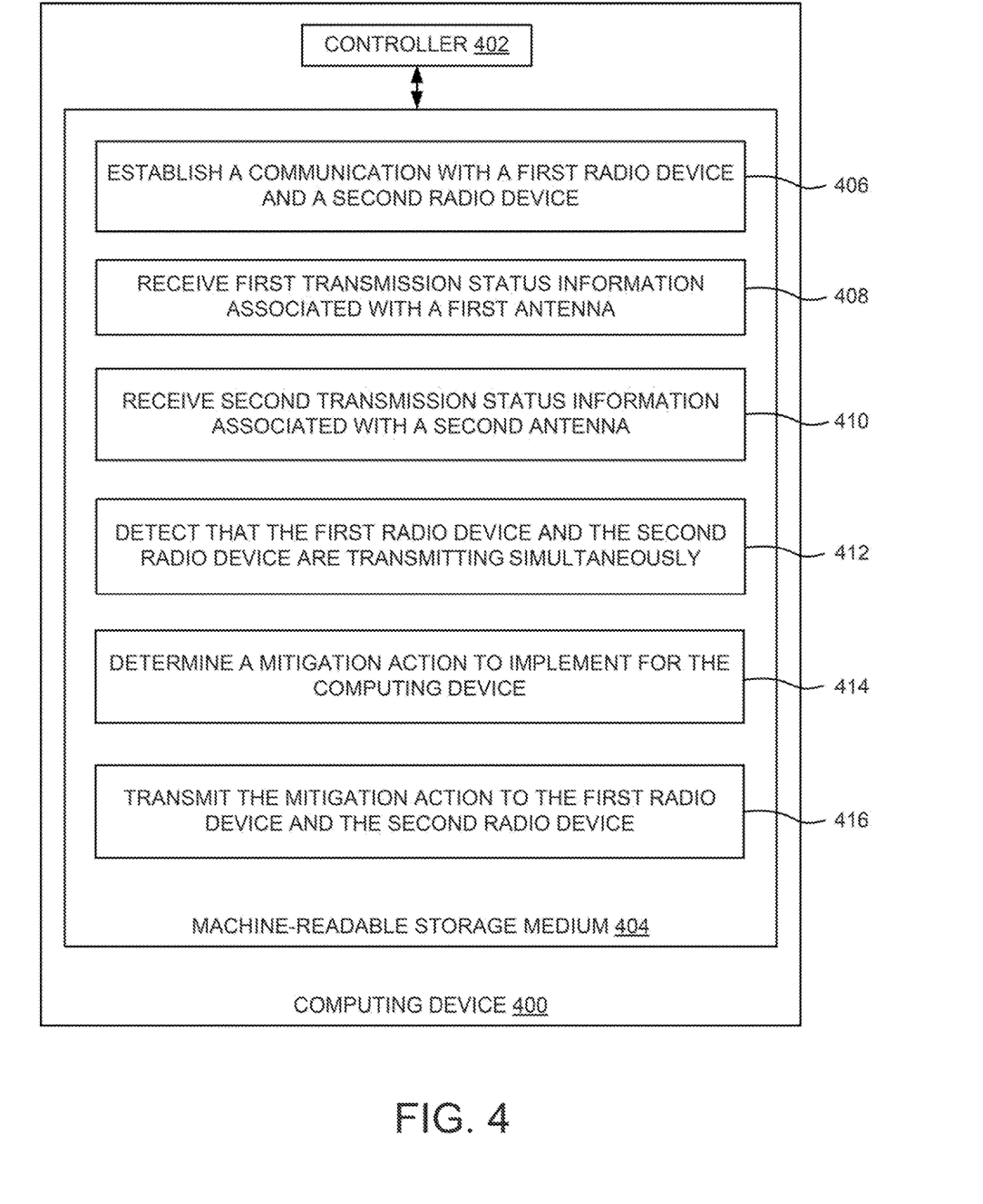
FIG. 4 is a block diagram of an example computing device including a non-transitory machine-readable storage medium, storing instructions to determine a mitigation action based on a simultaneous transmission via first and second antennas.

FIG. 4 is a block diagram of an example computing device 400 including a non-transitory machine-readable storage medium 404, storing instructions to determine a mitigation action based on simultaneous transmission via first and second antennas. Computing device 400 (e.g., a wireless device) may include a controller 402 and machine-readable storage medium 404 communicatively coupled through a system bus, Controller 402 may be any type of central processing unit (CPU), microprocessor, or processing logic that interprets and executes machine-readable instructions stored in machine-readable storage medium 404.

Machine-readable storage medium 404 may be a random-access memory (RAM) or another type of dynamic storage device that may store information and machine-readable instructions that may be executed by controller 402. For example, machine-readable storage medium 404 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 404 may be a non-transitory machine-readable medium. In an example, machine-readable storage medium 404 may be remote but accessible to computing device 400.

Machine-readable storage medium 404 may store instructions 406-416. In an example, instructions 406 may be executed by controller 402 to establish a communication with a first radio device and a second radio device. Instructions 408 may be executed by controller 402 to receive first transmission status information associated with a first antenna from the first radio device.

Instructions 410 may be executed by controller 402 to receive second transmission status information associated with a second antenna from the second radio device. Instructions 412 may be executed by controller 402 to detect that the first radio device and the second radio device are transmitting simultaneously via the first antenna and the second antenna, respectively, based on the first transmission status information and the second transmission status information.

Instructions 414 may be executed by controller 402 to determine a mitigation action to implement for computing device 400 to maintain a radio frequency exposure compliance in response to the detection. In an example, instructions to determine the mitigation action may include instructions to:

determine a condition indicative of a non-compliance of the computing device with a radio frequency exposure threshold based on the first transmission status information and the second transmission status information, and determine the mitigation action corresponding to the determined condition using a look-up table.

Instructions 416 may be executed by controller 402 to transmit the mitigation action to the first radio device and the second radio device. Machine-readable storage medium 404 may further include instructions to receive a first acknowledgement and a second acknowledgement from the first radio device and the second radio device, respectively. The first acknowledgement and the second acknowledgement may indicate a status of implementation of the mitigation action.

Examples described in FIGS. 1A-4 may also be implemented in computing devices having a standalone radio access technology (e.g., a WLAN connection) having multiple transmitting antennas. In this example, a BIOS of a computing device may:
- establish a communication with a WLAN device via a WLAN driver,
- receive first transmission status information and second transmission status information associated with a first antenna and a second antenna, respectively, from the radio device via the WLAN driver,
- detect that the radio device is transmitting simultaneously via the first antenna and the second antenna, respectively, based on the first transmission status information and the second transmission status information,
- determine a mitigation action to implement for the radio device to maintain a radio frequency exposure compliance in response to the detection, and
- transmit the mitigation action to the radio device.

Figure 5:
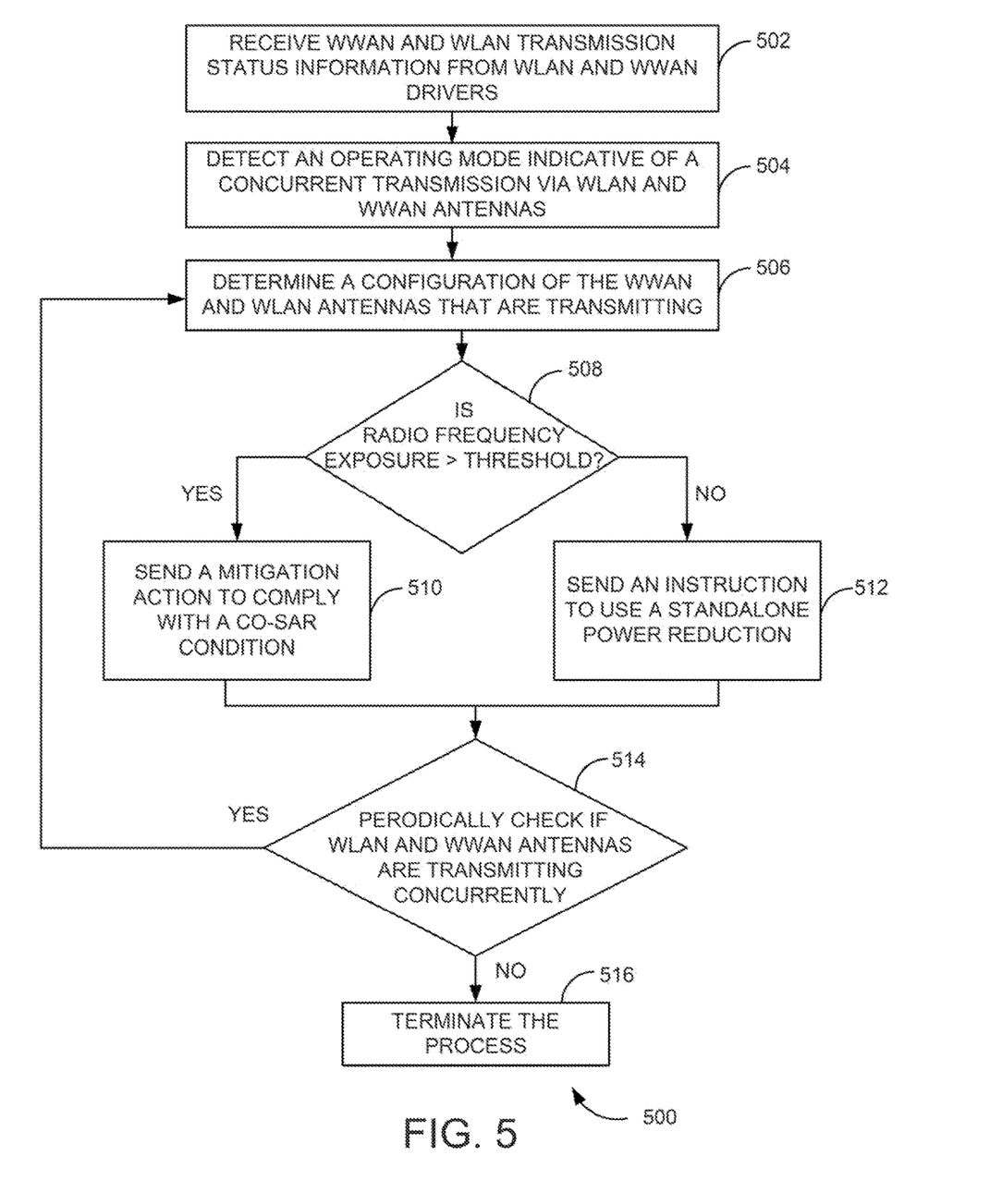
FIG. 5 is a flowchart illustrating an example method for implementing a mitigation action corresponding to an operating mode of a computing device.

FIG. 5 is a flowchart illustrating an example method 500 for implementing a mitigation action corresponding to an operating mode of a computing device. Example method 500 depicted in FIG. 5 may represent generalized illustrations, and that other processes may be added, or existing processes may be removed, modified, or rearranged without departing from the scope and spirit of the present application. In addition, the processes may represent instructions stored on a computer-readable storage medium that, when executed, may cause a processor to respond, to perform actions, to change states, and/or to make decisions. The processes of method 500 may represent functions and/or actions performed by functionally equivalent circuits like analog circuits, digital signal processing circuits, application specific integrated circuits (ASICs), or other hardware components associated with the system. Furthermore, example method 500 may not be intended to limit the implementation of the present application, but rather example method 500 may illustrate functional information to design/fabricate circuits, generate machine-readable instructions, or use a combination of hardware and machine-readable instructions to perform the illustrated processes.

At 502, WWAN and WLAN transmission status information may be received by a BIOS from WLAN and WWAN drivers executing in the computing device. At 504, an operating mode indicative of a concurrent transmission via WLAN and WWAN antennas may be detected by the BIOS, for instance, using the WWAN and WLAN transmission status information. For example, the operating mode indicative of a concurrent transmission may include a mobile hotspot mode, a multi-radio access technologies transmission, a high-speed connection, or the like.

At 506, a configuration of the WWAN and WLAN transmitting antennas may be determined using the WWAN and WLAN transmission status information. At 508, a check may be made to determine whether the WWAN and WLAN transmitting antennas configuration indicates a radio frequency exposure greater than a threshold. If the WWAN and WLAN transmitting antennas configuration indicates that the radio frequency exposure is greater than the threshold, the BIOS may retrieve a mitigation action corresponding to the WWAN and WLAN transmitting antennas configuration, for instance, using a look-up table. At 510, the mitigation action may be sent to WWAN and/or WLAN devices. In an example, the mitigation action, upon implementing by the WWAN device and/or WLAN device, may maintain the radio frequency exposure compliance of the computing device.

If the WWAN and WLAN transmitting antennas configuration indicates that the radio frequency exposure is not greater than the threshold, at 512, the BIOS may instruct WWAN device and/or WLAN device to implement standalone power reductions to comply with individual SAR conditions. In this example, the BIOS may not consider the WLAN and WWAN CO-SAR condition. At 514, the BIOS may periodically check whether the WWAN and WLAN antennas are transmitting concurrently. When the WWAN and WLAN antennas are transmitting concurrently, the process goes to block 506 and repeat the processes 506-514. When the WWAN and WLAN antennas are not transmitting concurrently, at 516, the process to determine the mitigation action by the BIOS may be terminated.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on," Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A computing device comprising:
a first radio device including a first antenna;
a second radio device including a second antenna; and
a basic input/output system (BIOS) to:
establish a communication with the first radio device and the second radio device;
receive first transmission status information associated with the first antenna from the first radio device;
receive second transmission status information associated with the second antenna from the second radio device;
detect a condition indicative of a combined transmit power of the first antenna and the second antenna exceeding a radio frequency exposure threshold based on the first and second transmission status information; and
instruct the first radio device, the second radio device, or both to perform a mitigation action to maintain the combined transmit power at or below the radio frequency exposure threshold in response to the detection.

2. The computing device of claim 1, wherein the BIOS is to:
instruct the first radio device, the second radio device, or both to modify a transmission power level of the first antenna, the second antenna, or both, respectively, to comply with the radio frequency exposure threshold; or instruct the first radio device or the second radio device to switch transmission from the first antenna or the second antenna, respectively, to a third antenna to comply with the radio frequency exposure threshold.

3. The computing device of claim 1, wherein the BIOS is to:
establish the communication with the first radio device and the second radio device via an advanced configuration and power interface (ACPI) specification.

4. The computing device of claim 1, wherein the BIOS is to:
establish the communication with the first radio device and the second radio device via a hardware interface, and wherein the hardware interface comprises an inter-integrated circuit (I2C) interface, a universal asynchronous receiver transmitter (UART) interface, a serial peripheral interface (SPI), an inter-integrated circuit sound (I2S) interface, or an improved inter integrated circuit (I3C) interface.

5. The computing device of claim 1, wherein the radio frequency exposure threshold is associated with a regional specific absorption rate (SAR) or a power density.

6. The computing device of claim 1, wherein the first transmission status information is to include information about a location, a transmitting frequency band type, and a transmission power level of the first antenna, and wherein the second transmission status information is to include information about a location, a transmitting frequency band type, and a transmission power level of the second antenna.

7. A non-transitory machine-readable storage medium encoded with instructions that, when executed by a controller of a computing device, cause the controller to:
establish a communication with a first radio device and a second radio device of the computing device via a first driver and a second driver, respectively;
receive first transmission status information associated with a first antenna from the first radio device;
receive second transmission status information associated with a second antenna from the second radio device;
determine an operating mode of the computing device using the first transmission status information and the second transmission status information;
determine a mitigation action corresponding to the operating mode of the computing device using a look-up table, wherein the mitigation action is to maintain a radio frequency exposure compliance of the computing device; and
transmit the mitigation action to the first radio device and the second radio device.

8. The non-trans tory machine-readable storage medium of claim 7, wherein the operating mode is indicative of an activation of a wireless communication feature.

9. The non-transitory machine-readable storage medium of claim 8, wherein the wireless communication feature comprises a mobile hotspot, a type of wireless connection, or any combination thereof.

10. The non-transitory machine-readable storage medium of claim 7, wherein instructions to determine the mitigation action comprise instructions to:
determine the mitigation action to reduce a transmission power level of the first antenna, the second antenna, or both to comply with a radio frequency exposure threshold, wherein the radio frequency exposure threshold is associated with a regional specific absorption rate (SAR) or a power density; or
determine the mitigation action to switch transmission from the first antenna or the second antenna to a third antenna to comply with the radio frequency exposure threshold.

11. The non-transitory machine-readable storage medium of claim 7, wherein the first driver and the second driver are to comply with an advanced configuration and power interface (ACPI) specification.

12. A non-transitory machine-readable storage medium encoded with instructions that, when executed by a controller of a computing device, cause the controller to:
establish a communication with a first radio device and a second radio device;
receive first transmission status information associated with a first antenna from the first radio device;
receive second transmission status information associated with a second antenna from the second radio device;
detect that the first radio device and the second radio device are transmitting simultaneously via the first antenna and the second antenna, respectively, based on the first transmission status information and the second transmission status information;
determine a mitigation action to implement for the computing device to maintain a radio frequency exposure compliance in response to the detection; and
transmit the mitigation action to the first radio device and the second radio device.

13. The non-transitory machine-readable storage medium of claim 12, wherein instructions to determine the mitigation action comprise instructions to:
determine a condition indicative of a non-compliance of the computing device with a radio frequency exposure threshold based on the first transmission status information and the second transmission status information, wherein the radio frequency exposure threshold is associated with a regional specific absorption rate (SAR) or a power density; and
determine the mitigation action corresponding to the determined condition using a look-up table.

14. The non-transitory machine-readable storage medium of claim 12, further comprising instructions to:
receive a first acknowledgement and a second acknowledgement from the first radio device and the second radio device, respectively, wherein the first acknowledgement and the second acknowledgement are to indicate a status of implementation of the mitigation action.

15. The non-transitory machine-readable storage medium of claim 12, wherein the first radio device is to establish a wireless local area network (WAN) connection, and wherein the second radio device is to establish a wireless wide area network (WWAN) connection.

* * * * *